United States Patent
Lynch et al.

(10) Patent No.: US 6,268,441 B1
(45) Date of Patent: Jul. 31, 2001

(54) METHOD FOR POLYMERIZING VINYL MONOMERS

(75) Inventors: John Lynch, Monsheim; Heinz Friedrich Sutoris, Frankenthal; Jürgen Zubiller, Kaiserslautern; Alexander Aumüller, Neustadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/308,633

(22) PCT Filed: Nov. 11, 1997

(86) PCT No.: PCT/EP97/06290

§ 371 Date: May 27, 1999

§ 102(e) Date: May 27, 1999

(87) PCT Pub. No.: WO98/23649

PCT Pub. Date: Jun. 4, 1998

(30) Foreign Application Priority Data

Nov. 27, 1996 (DE) .............................................. 196 48 811

(51) Int. Cl.$^7$ ................................ C08F 2/16; C08F 14/06
(52) U.S. Cl. .............................. 526/74; 526/62; 526/204; 526/220; 526/344.2
(58) Field of Search .............................. 526/74, 204, 220, 526/344.2, 62

(56) References Cited

U.S. PATENT DOCUMENTS 4,980,079 * 12/1990 Yamato et al. .................... 526/74 X

* cited by examiner

*Primary Examiner*—Fred Teskin
(74) *Attorney, Agent, or Firm*—Oblon, Spivak, McClelland, Maier & Neustadt, P.C.

(57) ABSTRACT

Vinyl monomers are polymerized in the aqueous phase in the presence of at least one N-oxyl compound of a secondary amine, having no hydrogen atoms bonded to the α carbon atoms. This process substantially eliminates deposits on reactor surfaces.

7 Claims, No Drawings

METHOD FOR POLYMERIZING VINYL MONOMERS

POLYMERIZATION OF VINYL MONOMERS

The present invention relates to the use of N-oxyl compounds for preventing wall deposits during the addition polymerization of vinyl monomers in aqueous phase.

In the course of polymerization reactions it is common for polymer deposits to appear on the reactor walls. These polymer deposits cause processing difficulties since they have to be removed at regular intervals, generally after each polymerization reaction, often entailing considerable expense. Moreover the deposits, which generally consist of polymers that are atypical in terms, for example, of their molecular weight distribution, can in some cases become detached and so lead to inhomogeneities in the polymers.

Various measures have been developed to remedy the formation of deposits. Since the extent of formation of deposits depends heavily on the surface structure of the reactor walls—their roughness, for example—the measures are aimed primarily at smoothing the surfaces. In addition to mechanical measures attempts have also been made to maintain the quality of the surface by adding corrosion inhibitors to the polymerization (see, for example, G. W. Becker, D. Braun (eds.), Kunststoff Handbuch, Hanser Verlag, Munich, Vienna 1986, Volume 2/1, p. 153). These measures, however, are normally unable to adequately prevent the formation of deposits.

The earlier German Patent Application 19 609 312.0 describes a process for preventing the premature polymerization of certain vinyl monomers in the course, for example, of their distillation, purification, storage and transportation, by adding N-oxyl compounds of secondary amines. The use of N-oxyl compounds has also been described for stabilizing styrene and other vinylaromatic compounds in the course of distillation (U.S. Pat. No. 5,254,760). It is also known, however, that even traces of such nitroxyl compounds disrupt the subsequent polymerization process; they cause retarded polymerization and uncontrolled chain termination, resulting in polymers deficient in reproducibility and of short chain length. These deleterious effects are described by Mardare et al. in Polym. Prep. (Am. Chem. Soc., Div. Polym. Sci.) 35 (1), 778 (1994).

It is an object of the present invention to find a vinyl monomer polymerization process in which the formation of wall deposits is substantially eliminated without perceptibly affecting the polymerization process.

We have found that this object is achieved by the use of N-oxyl compounds of secondary amines which carry no hydrogens on the a carbons to prevent deposits on reactor surfaces during the polymerization of vinyl monomers in aqueous phase.

By vinyl monomers are meant all addition-polymerizable monomers which carry a terminal olefinic double bond. Examples that may be mentioned are acrylic and methacrylic acid and their derivatives such as nitriles and esters, especially methyl, ethyl, propyl and butyl acrylate and methacrylate, and also vinyl esters of $C_2$–$C_5$ carboxylic acids, especially vinyl acetate, vinyl propionate, vinyl butanoate, aromatic vinyl compounds, especially styrene, dienes, especially butadiene, vinyl halides, especially vinyl chloride, vinyl ethers, such as methyl, ethyl or butyl vinyl ether, vinyl thioethers, vinylcarbazoles, vinylpyrrolidones, vinylphthalimides, vinyl isocyanates, vinylcaprolactams, vinylimidazoles, vinylformamide, vinylsulfonic acid, and vinyl silanes such as vinyltriacetoxysilane, vinyltrichlorosilane or vinyltrimethoxysilane.

α-Olefins are also suitable, such as ethylene, propylene, 1-butene, 1-hexene and 1-octene, especially together with other comonomers in copolymerization processes.

The process of the invention can be employed to particular advantage in the case of such copolymerization processes. Examples that may be mentioned of suitable copolymers which can be prepared by the processes are styrene-butadiene, synthetic rubberlike block polymers, such as styrene-butadiene-styrene, styrene-butyl acrylate, butadiene-acrylonitrile, acrylonitrile-butadiene-styrene, and ethylene-vinyl chloride.

The use according to the invention is particularly suitable in the polymerization of styrene, alone or together with further comonomers, and, if desired, in the presence of volatile blowing agents, such as pentane, and for the polymerization of vinyl chloride.

The process of the invention relates to polymerizations in aqueous phase. The term aqueous phase is intended to denote solutions, emulsions and suspensions of the corresponding monomers or polymers in water and in solvent mixtures comprising a substantial proportion, i.e., at least 20% by weight, of water. All customary emulsion polymerizations and suspension polymerizations, therefore, can be conducted in accordance with the process of the invention. The process conditions which can be chosen are those which are customary for such polymerization processes and are described, for example, in Houben Weyl, Methoden der organischen Chemie, Vol. E20, p. 218 ff and in Ullmanns Encyklopädie der technischen Chemie, 4th edition, Vol. 19, p. 132 ff. and the literature cited therein.

In accordance with the invention, N-oxyl compounds of secondary amines are present during the polymerization process. The application of these N-oxyl compounds can be made in various ways.

It has been found advantageous to add the N-oxyl compound to the polymerization mixture. Alternatively, the N-oxyl compound may already be present in the monomer in order to protect it against premature polymerization.

The concentration of the N-oxyl compound in the polymerization mixture should be such that it has little effect on the rate of polymerization. The sensitivity of the polymerization to the amount of N-oxyl compound depends on a variety of parameters: in particular, on the nature of the monomer, the structure of the N-oxyl compound, the temperature, and other free-radical initiators and free-radical scavengers which may be present in the reaction mixture. The optimum concentration, however, can be determined in a few preliminary experiments under given process parameters.

A concentration range which has been found advantageous for the N-oxyl compound(s) in the polymerization mixture is that from 0.5 to 50 ppm, in particular from 1 to 20 ppm and, especially, from 2 to 10 ppm (1 ppm=$10^{-6}$ parts by weight of N-oxyl compound based on the overall weight of the monomers). At these concentrations, the formation of deposits is generally inhibited completely without any notable effect on the kinetics of the reaction.

In addition to adding the N-oxyl compound to the polymerization mixture, a process variant which has proven particularly appropriate is that in which the reactor surface is wetted with a solution of the N-oxyl compound before the reactor is filled with the polymerization mixture.

Wetting can be carried out simply and effectively by spraying the reactor walls and other components within the reactor, such as the stirrer, with a solution of the N-oxyl compound. The N-oxyl compounds are in many cases of poor solubility in water but dissolve for the most part in organic solvents such as methanol, ethanol, propanol, acetone, ethyl acetate, dimethylformamide, etc. A particularly appropriate solvent for many N-oxyl compounds is methanol. The concentration of the N-oxyl compound in the spray solution is not critical and is advantageously set at between 0.01 and 1% by weight, based on the overall mass of the spray solution.

Alternatively, the reactor surface can be wetted by filling it with a solution similar to the spray solution and then draining off that solution.

Wetting of the reactor surface with the N-oxyl compound has the advantage over its addition to the polymerization mixture that the effect on the rate of polymerization is extremely small and, in addition, that the region above the liquid level, especially the region just above the liquid level, in which deposits are common, is also protected against the formation of deposits.

It is also advantageous to combine both forms of application, in which case very small amounts are sufficient for direct addition to the polymerization solution.

Suitable N-oxyl compounds for use in the process of the invention are, for example, those having the following structures

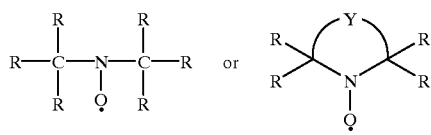

where R is identically or differently alkyl, cycloalkyl, aralkyl or aryl radicals, which may also be linked in pairs to form a ring system, and Y is a group required to complete a 5- or 6-membered ring. For example, R is a $C_1$–$C_{20}$-, in particular a $C_1$–$C_8$-alkyl radical, a $C_5$- or $C_6$-cycloalkyl radical, a benzyl radical or a phenyl radical. Y is, for example, an alkylene group —$(CH_2)_2$— or —$(CH_2)_3$—.

Also suitable are N-oxyl compounds such as the following structures

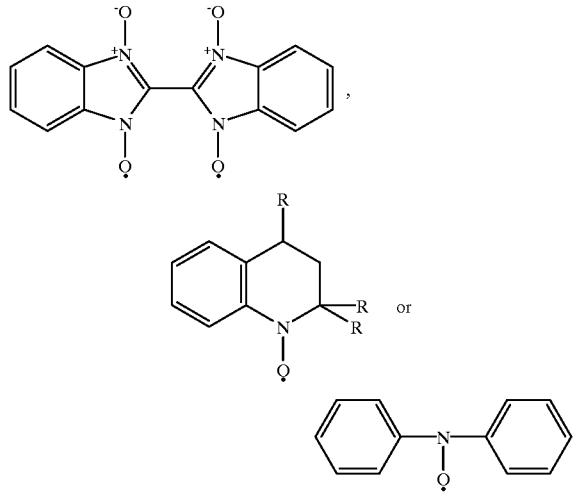

where the aromatic rings may each carry from 1 to 3 inert substituents, such as $C_1$–$C_4$-alkyl, $C_1$–$C_4$-alkoxy or cyano.

It is preferred to employ sterically hindered amine derivatives of cyclic amines, such as of piperidine or pyrrolidine compounds, which may include a further heteroatom in the ring, such as nitrogen, oxygen or sulfur, said heteroatom not being vicinal to the hindered amine nitrogen. The steric hindrance is provided by substituents in both vicinal positions to the amine nitrogen, suitable substituents being hydrocarbon radicals, which replace all 4 hydrogens of the $\alpha$—$CH_2$ groups. Examples of substituents are phenyl, $C_3$–$C_6$-cycloalkyl, benzyl and in particular $C_1$–$C_6$-alkyl radicals, in which case the alkyl radicals attached to the same a carbon may be linked with one another to form a 5- or 6-membered ring. Particularly preferred radicals are those given individually for $R^1$ and $R^2$. Preferred N-oxyls of sterically hindered amines that are employed are derivatives of 2,2,6,6-tetraalkylpiperidine.

Preferred N-oxyl compounds for use in the process of the invention are those of the general formula I

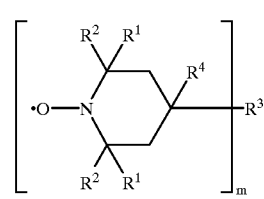

where
$R^1$ and $R^2$ are $C_1$–$C_4$-alkyl or phenyl or, together with the carbon to which they are attached, are a 5- or 6-membered saturated hydrocarbon ring,
$R^3$ is hydrogen, hydroxyl, amino, $SO_3H$, $SO_3M$, $PO_3H_2$, $PO_3HM$, $PO_3M_2$, organosilicon radicals or an m-valent organic radical which is attached via oxygen or nitrogen, or, together with $R^4$, is oxygen or a ring structure defined under $R^4$, where M is an alkali metal,
$R^4$ is hydrogen or $C_1$–$C_{12}$-alkyl or, together with $R^3$, is oxygen or, together with $R^3$ and the carbon to which they are attached, is a ring structure

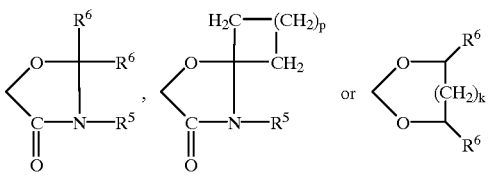

where, if $R^3$ and $R^4$ join to form a radcial, m is 1,
$R^5$ is hydrogen, $C_1$–$C_{12}$-alkyl or —$(CH_2)_z$—$COOR^6$,
$R^6$ is identical or different $C_1$–$C_{18}$-alkyl,
k is 0 or 1
z, p are from 1 to 12, and
m is from 1 to 100.

$R^1$ and $R^2$ can, for example, be methyl, ethyl, propyl or butyl or together can form a tetra- or pentamethylene group. Preferably, $R^1$ and $R^2$ are methyl groups.

$R^4$ is suitably, for example, hydrogen, the abovementioned $C_f$–$C_4$-alkyl groups, and also pentyl, sec-pentyl, tert-pentyl, neopentyl, hexyl, 2-methylpentyl, heptyl, 2-methylhexyl, octyl, isooctyl, 2-ethylhexyl, nonyl, 2-methylnonyl, isononyl, 2-methyloctyl, decyl, isodecyl, 2-methylnonyl, undecyl, isoundecyl, dodecyl and isododecyl, (the names isooctyl, isononyl and isodecyl are trivial names and derive from the carbonyl compounds obtained by oxo synthesis; cf. in this regard Ullmann s Encyclopedia of Industrial Chemistry, 5th Edition, Vol. Al. pages 290–293, and also Vol. A10, pages 284 and 285).

p is preferably 6–12, more preferably 9.
z is preferably 1–4, more preferably 2.

Other than hydrogen, $R^5$ is suitably, for example, the abovementioned $C_1$–$C_{12}$-alkyl groups. Preferably, $R^5$ is hydrogen, $C_1$–$C_4$-alkyl or $(CH_2)_z$—$COO(C_1$–$C_6$-alkyl), more preferably the radicals —$CH_2$—$CH_2$—$COO(CH_2)_{11}$—$H_3$ and —$CH_2$—$CH_2$—$COO(CH_2)_{13}$—$CH_3$.

$R^6$ can, for example, be one of the abovementioned $C_1$–$l_2$-alkyl groups or tridecyl, isotridecyl, tetradecyl, pentadecyl, hexadecyl, heptadecyl or octadecyl. Dodecyl and hexadecyl are preferred.

Preferred radicals $R^3$ are, for example, the following m-valent radicals n is an even number m.

If $R^3$ is one of these radicals then $R^4$ is preferably hydrogen. The variable m in this case can be from 1 to 100. m is preferably 1, 2, 3, 4 or a number from 10 to 50, mixtures generally being employed especially in the case of the oligomeric or polymeric radicals $R^3$.

Suitable radicals $R^7$ are the same as those specified for $R^5$. $R^7$ is preferably $C_1$–$C_4$-alkyl.

Other than hydrogen, suitable radicals $R^8$ are the same as those specified for $R^6$. $R^8$ is preferably hydrogen.

$R^9$ is suitably, in particular, vinyl, isopropenyl or $C_{15}$–$C_{17}$-alkyl radicals.

Examples of suitable radicals $R^{10}$ are the abovementioned $C_8$–$C_{18}$-alkyl radicals and also nonadecyl,

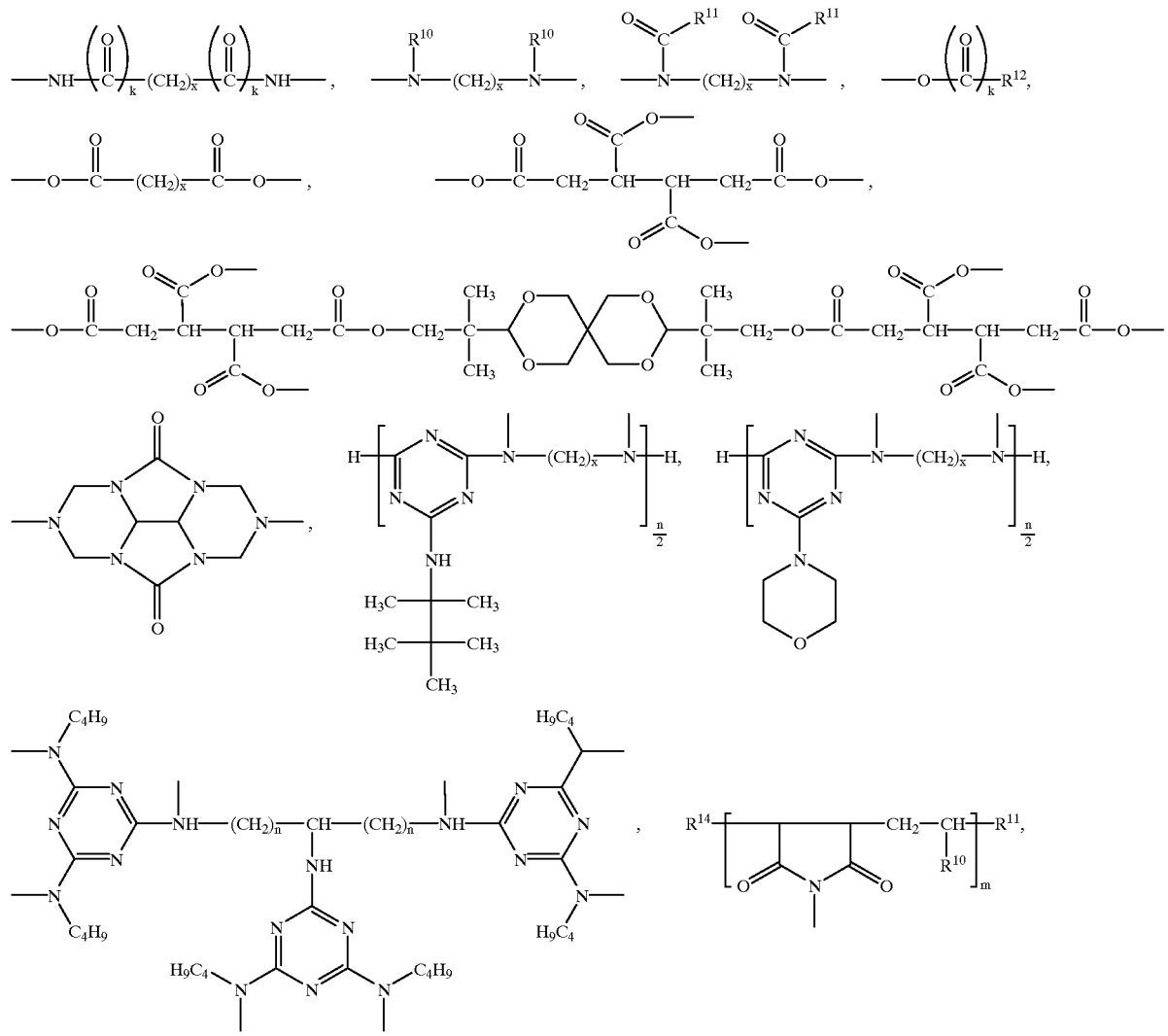

where
$R^7$ is $C_1$–$C_{12}$-alkyl or —$(CH_2)_z$—$COOR^6$
$R^8$ is hydrogen or $C_1$–$C_{18}$-alkyl,
$R^9$ is $C_1$–$C_{18}$-alkyl, vinyl or isopropenyl,
$R^{10}$ is $C_8$–$C_{22}$-alkyl,
$R_{11}$ is hydrogen or an organic radical as normally formed in the free-radical polymerization of the initial monomers,
k is 0 or 1,
x is from 1 to 12 and eicosyl, uneicosyl and doeicosyl. In this case preference is given to mixtures of different radicals $R^{10}$ differing in the length of the carbon chain.

The radicals $R^{11}$ are hydrogen or organic radicals as formed in the free-radical polymerization of the initial monomers: in this case, of an ethylene derivative and a maleimide derivative; in other words, for example, a radical formed from the polymerization initiator or from a free radical occurring as an intermediate, or another such radical, as is familiar to the person skilled in the art.

It is also possible with advantage to employ nitroxyl compounds of the formula (Ia)

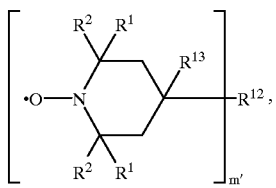
(Ia)

where $R^1$ and $R^2$ are as defined above, $R^{12}$ is an m'-valent radical attached via carbon, oxygen or nitrogen, $R^{13}$ is hydrogen, $C_1$–$C_{12}$-alkyl or $C_1$–$C_{12}$-alkoxy or, together with $R^{12}$, is an m'-valent radical attached via carbon or oxygen by a chemical double bond to the carbon which carries these groups, or, together with $R^{12}$ and the carbon which carries these groups, is a saturated isocyclic or heterocyclic, 3- to 7-membered ring, in which case m is 1, and m' is 1, 2 or 3.

Suitable m-valent radicals $R^{12}$ are $C_1$–$C_4$-alkyl, unsubstituted phenyl and phenyl substituted by from one to three $C_1$–$C_4$-alkyl radicals, examples of $C_1$–$C_4$-alkyl radicals having already been set out above. The attachment of these radicals to the piperidine ring can be via oxygen, an NH group or an N($C_1$–$C_4$-alkyl) group.

Examples of possible radicals $R^{12}$ (where the lines denote the free valences) are:

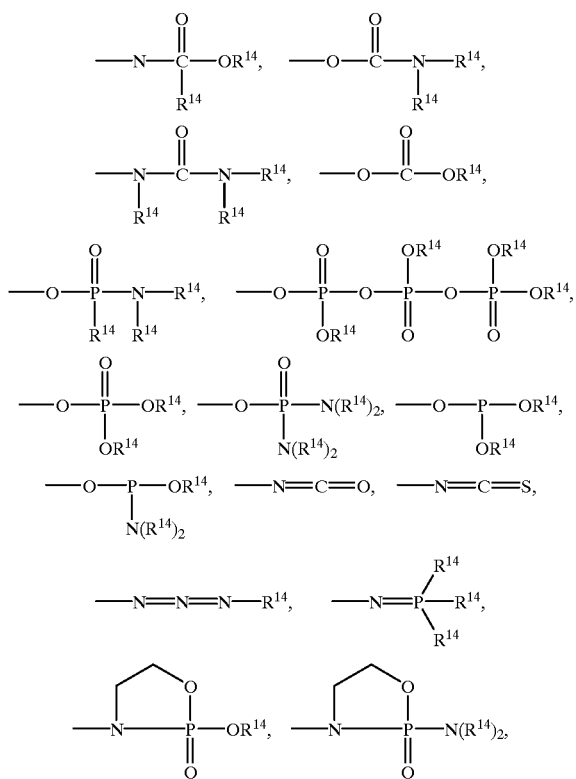

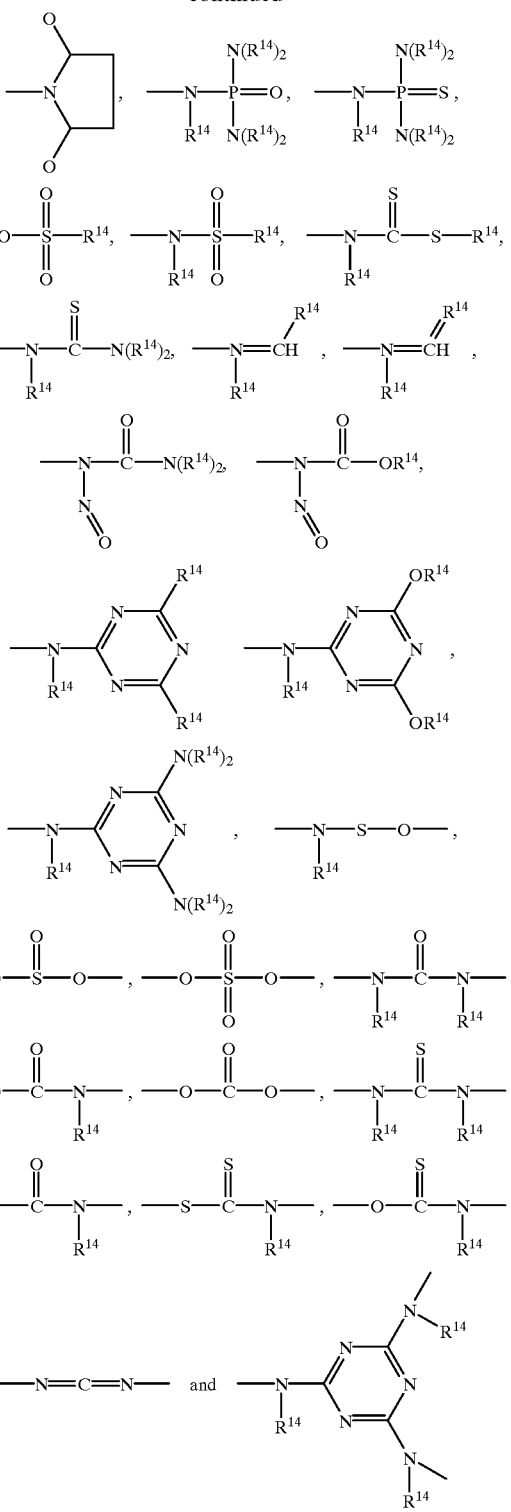

The $C_1$–$C_{12}$-alkyl and $C_1$–$C_{12}$-alkoxy groups which are possible representatives of the radicals $R^{13}$ have already been addressed in an exemplary manner above for the radicals $R^4$. The radicals $R^{12}$ and $R^{13}$ may also together form a group which then is attached through a chemical double bond via carbon or nitrogen to the carbon which carries the groups (the carbon in position 4 of the piperidine ring). Examples of such 2 m'-valent groups (where the lines denote the free valences) can be:

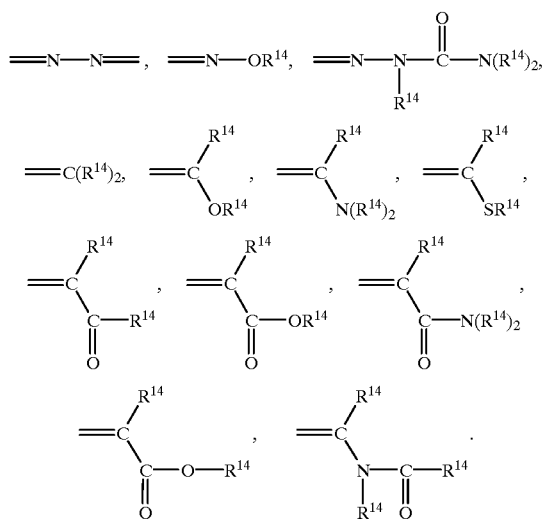

It is also possible for the radicals $R^{12}$ and $R^{13}$, with the carbons carrying these groups, to form a 3- to 7-membered isocyclic or heterocyclic ring.

Examples of such rings are, for instance:

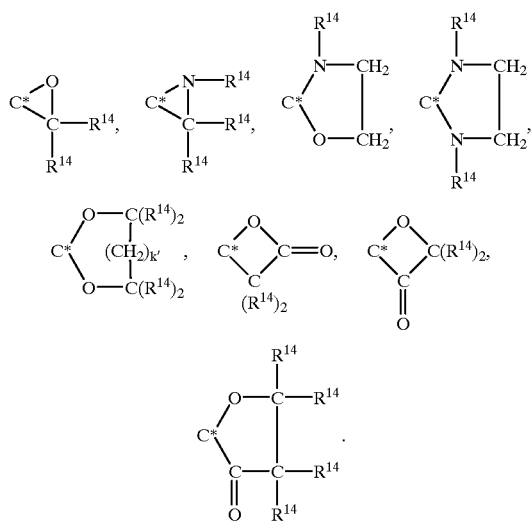

The groups $R^{14}$ in these groups can be identical or different and are hydrogen, $C_1$–$C_{12}$-alkyl, unsubstituted phenyl, or phenyl substituted by from one to four $C_1$–$C_4$-alkyl groups. Examples of corresponding $C_1$–$C_{12}$-alkyl groups, and $C_1$–$C_4$-alkyl groups which may occur as substituents on the phenyl ring, have already been indicated above. The variable k' can adopt a value of 0,1 or 2. C* denotes the carbon in position 4 of the piperidine, which is incorporated into the ring system.

Other preferred nitroxyl compounds are the following:
1-oxyl-2,2,6,6-tetramethylpiperidine,
1-oxyl-2,2,6,6-tetramethylpiperidin-4-ol,
1-oxyl-2,2,6,6-tetramethylpiperidin-4-one,
1-oxyl-2,2,6,6-tetramethylpiperidin-4-yl acetate,
1-oxyl-2,2,6,6-tetramethylpiperidin-4-yl 2-ethylhexanoate,
1-oxyl-2,2,6,6-tetramethylpiperidin-4-yl stearate,
1-oxyl-2,2,6,6-tetramethylpiperidin-4-yl benzoate,
1-oxyl-2,2,6,6-tetramethylpiperidin-4-yl 4-tert-butylbenzoate,
bis(1-oxyl-2,2,6,6-tetramethylpiperidin-4-yl) succinate,
bis(1-oxyl-2,2,6,6-tetramethylpiperidin-4-yl) adipate,
bis(1-oxyl-2,2,6,6-tetramethylpiperidin-4-yl) sebacate,
bis(1-oxyl-2,2,6,6-tetramethylpiperidin-4-yl) n-butylmalonate,
bis(1-oxyl-2,2,6,6-tetramethylpiperidin-4-yl) phthalate,
bis(1-oxyl-2,2,6,6-tetramethylpiperidin-4-yl) isophthalate,
bis(1-oxyl-2,2,6,6-tetramethylpiperidin-4-yl) terephthalate,
bis(1-oxyl-2,2,6,6-tetramethylpiperidin-4-yl) hexahydroterephthalate,
N,N'-bis(1-oxyl-2,2,6,6-tetramethylpiperidin-4-yl) adipamide,
N-(1-oxyl-2,2,6,6-tetramethylpiperidin-4-yl)caprolactam,
N-(1-oxyl-2,2,6,6-tetramethylpiperidin-4-yl) dodecylsuccinimide,
2,4,6-tris[N-butyl-N-(1-oxyl-2,2,6,6-tetramethyl-piperidin-4-yl]-s-triazine,
4,4'-ethylenebis(1-oxyl-2,2,6,6-tetramethylpiperazin-3-one), and tris(2,2,6,6-tetramethyl-1-oxylpiperidin-4-yl) phosphite.

In the process of the invention it has been found particularly advantageous to use N,N'-bis(1-oxyl-2,2,6,6-tetramethylpiperidin-4-yl)-N,N'-bis-formyl-1,6-diaminohexane as the N-oxyl compound.

The nitroxyl compounds described can be prepared from the corresponding piperidine compounds by oxidation with hydrogen peroxide, for example. Details of this oxidation are given, for example, in the earlier German Patent Application 195 101 84.7. The secondary amines which carry no hydrogens on the α carbons, such as piperidine compounds, and their preparation are common knowledge.

EXAMPLES 1 to 3

A 3 l steel autoclave was filled with
1300 g of water
10.5 g of 4% by weight polyvinyl alcohol solution, degree of saponification 88%
0.34 g of 40% strength by weight polyvinyl alcohol solution, degree of saponification 47%
11.65 g of 3% strength by weight hydroxymethylpropy-lcellulose solution
0.56 g of tert-butyl perneodecanoate
1.75 g of sodium tripolyphosphate
and with varying amounts (see table) of N,N'-bis(1-oxyl-2,2,6,6-tetramethylpiperidin-4-yl)-N,N'-bis-formyl-1,6-diaminohexane. The autoclave was closed, flushed with nitrogen, examined for leaks, and evacuated. Then 700 g of vinyl chloride were introduced. The autoclave was heated to 55° C. Polymerization was continued until the pressure had fallen by 4 bar, and then the autoclave was let down. The results are given in the table.

EXAMPLE 4

A 0.1% strength solution of N,N'-bis(1-oxyl-2,2,6,6-tetramethylpiperidin-4-yl)-N,N'-bis-formyl-1,6-diaminohexane in methanol was sprayed uniformly onto the inner surface of the autoclave and dried at room temperature. The autoclave was charged, and the reaction conducted, exactly as described in Examples 1 to 3 but without the addition of N,N'-bis-(1-oxyl-2,2,6,6-tetramethylpiperidin-4-yl)-N,N'-bis-formyl-1,6-diaminohexane. The result is indicated in the table.

Noninventive, comparative example

An autoclave was charged, and the reaction conducted, exactly as described in Example 4 but without the surface being sprayed. The result is indicated in the table.

TABLE

| Example | N-oxyl | Run time min. | Deposit |
|---|---|---|---|
| 1 | 10 ppm | 269 | Deposit only above the liquid level |
| 2 | 20 ppm | 332 | Deposit only above the liquid level |
| 3 | 50 ppm | 405 | Deposit only above the liquid level |
| 4 | * | 264 | No deposit |
| Comparative | — | 256 | Deposit everywhere; removable only by mechanical means |

* Autoclave sprayed with N,N'-bis-(1-oxyl-2,2,6,6-tetramethylpiperidin-4-yl)-N,N'-bisformyl-1,6-diaminohexane solution \* Autoclave sprayed with N,N'-bis-(1-oxyl-2,2,6,6-tetramethylpiperidin-4-yl)-N,N'-bisformyl-1,6-diaminohexane solution

We claim:

1. A process for polymerizing a polymerization mixture of vinyl chloride in aqueous phase in a reactor, which comprises polymerizing the vinyl chloride in the presence of at least one N-oxyl compound of a secondary amine which carries no hydrogens on the α carbons.

2. A process as claimed in claim 1, wherein the N-oxyl compound is added to the polymerization mixture.

3. A process as claimed in claim 1, wherein the N-oxyl compound is added to the polymerization mixture in a concentration of from 0.5 to 50 ppm.

4. A process as claimed in claim 1, wherein the surfaces of the reactor are wetted with a solution of the N-oxyl compound before the reactor is filled with the polymerization mixture.

5. A process as claimed in claim 1, wherein the N-oxyl compound is represented by formula I:

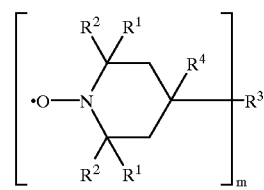

wherein
$R^1$ and $R^2$ are $C_1$–$C_4$-alkyl or phenyl or, together with the carbon to which they are attached, are a 5- or 6-membered saturated hydrocarbon ring,
$R^3$ is hydrogen, hydroxyl, amino, $SO_3H$, $SO_3M$, $PO_3H_2$, $PO_3HM$, $PO_3M_2$, organosilicon radicals or an m-valent organic radical which is attached via oxygen or nitrogen, or, together with $R^4$, is oxygen or a ring structure defined under $R^4$, wherein M is an alkali metal,
$R^4$ is hydrogen or $C_1$–$C_{12}$-alkyl or, together with $R^3$, is oxygen or, together with $R^3$ and the carbon to which they are attached, is a ring structure

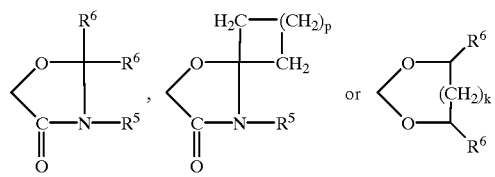

wherein, if $R^3$ and $R^4$ join to form a radical, m is 1,
$R^5$ is hydrogen, $C_1$–$C_{12}$-alkyl or —$(CH_2)_z$—$COOR^6$,
$R^6$ is identical or different $C_1$–$C_{18}$-alkyl,
k is 0 or 1
z, p are from 1 to 12, and
m is from 1 to 100.

6. A process as claimed in claim 5, wherein the radical $R^3$ in formula I is a radical represented by the formula:

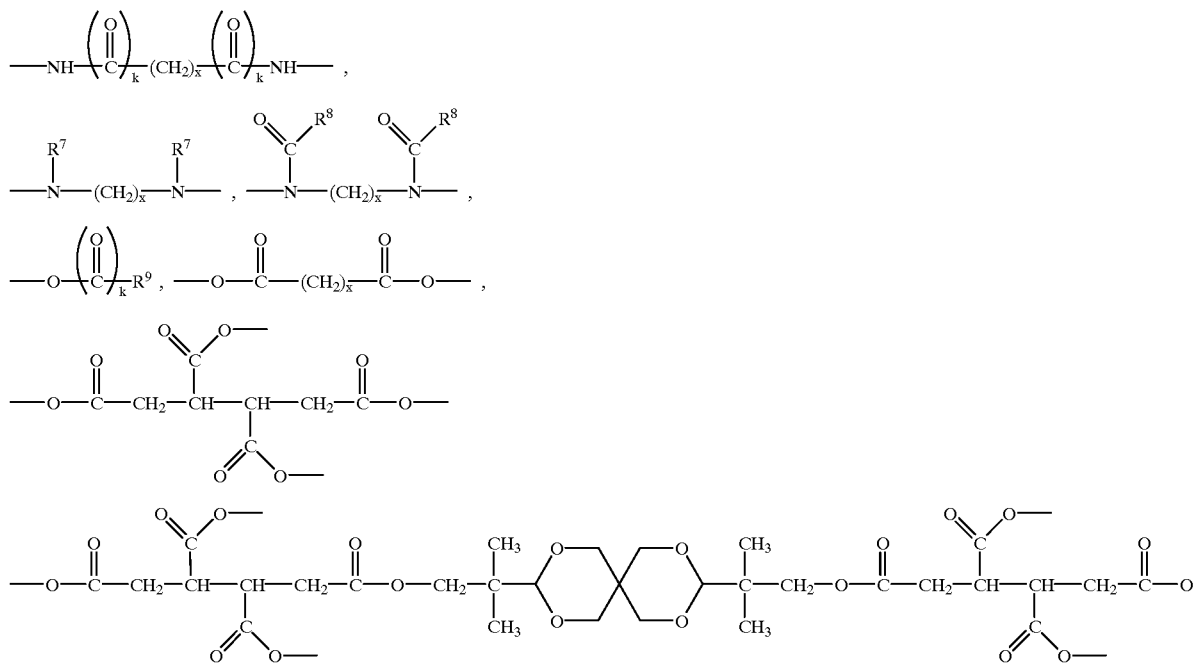

-continued

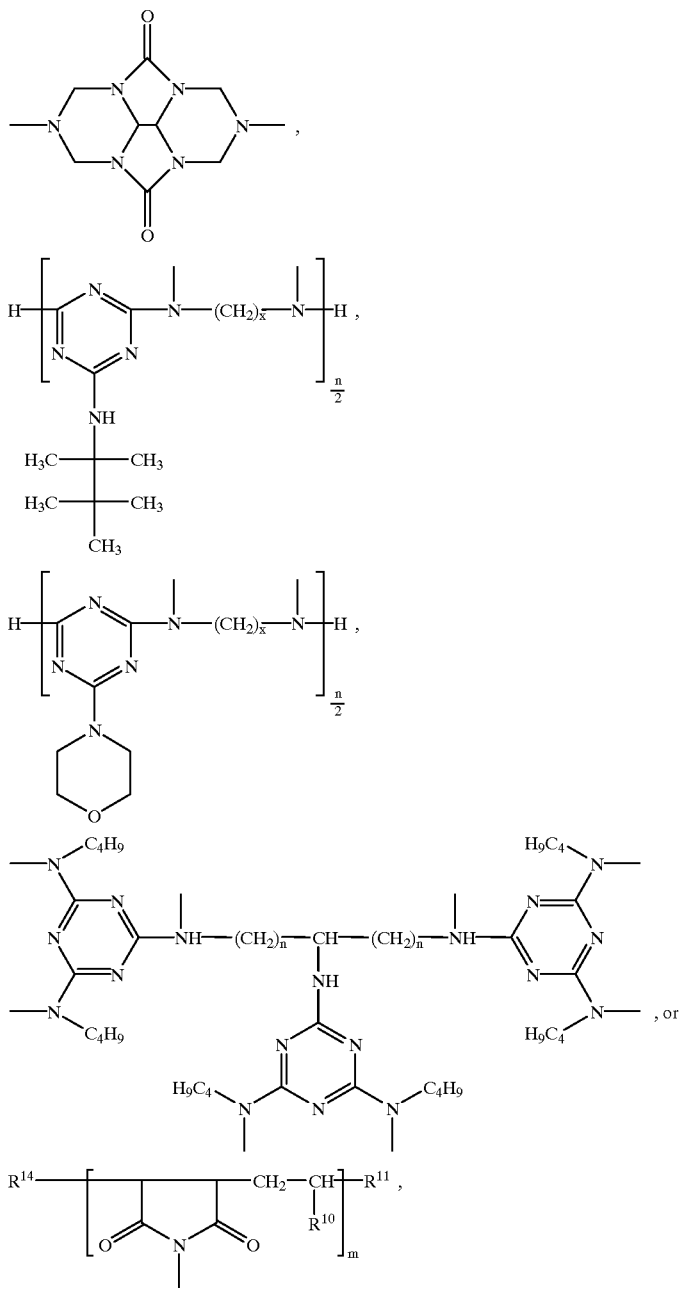

wherein
$R^7$ is $C_1$–$C_{12}$-alkyl or —$(CH_2)_z$—$COOR^6$
$R^8$ is hydrogen or $C_1$–$C_{18}$-alkyl,
$R^9$ is $C_1$–$C_{18}$-alkyl, vinyl or isopropenyl,
$R^{10}$ is $C_8$–$C_{22}$-alkyl,
$R^{11}$ is hydrogen or an organic radical as normally formed in a free-radical polymerization of the vinyl chloride, k is 0 or 1,
x is from 1 to 12 and
n is an even number from 1 to 100.

7. A process as claimed in claim 1, wherein the N-oxyl compound is N,N'-bis(1oxyl-2,2,6,6,-tetramethyl-piperidin-4-yl)-N,N'-bis-formyl-1,6-diaminohexane.

* * * * *